United States Patent
Sammour et al.

(10) Patent No.: US 8,837,285 B2
(45) Date of Patent: Sep. 16, 2014

(54) METHOD AND APPARATUS FOR INITIALIZING, PRESERVING, AND RECONFIGURING TOKEN BUCKETS

(75) Inventors: Mohammed Sammour, Montreal (CA); Stephen E. Terry, Northport, NY (US); Jin Wang, Central Islip, NY (US)

(73) Assignee: Interdigital Patent Holdings, Inc., Wilmington, DE (US)

( * ) Notice: Subject to any disclaimer, the term of this patent is extended or adjusted under 35 U.S.C. 154(b) by 534 days.

(21) Appl. No.: 12/360,676

(22) Filed: Jan. 27, 2009

(65) Prior Publication Data

US 2009/0196175 A1    Aug. 6, 2009

Related U.S. Application Data

(60) Provisional application No. 61/025,478, filed on Feb. 1, 2008.

(51) Int. Cl.
*H04W 36/02* (2009.01)
*H04W 72/08* (2009.01)
*H04L 29/08* (2006.01)
*H04W 72/12* (2009.01)

(52) U.S. Cl.
CPC .............. *H04W 36/02* (2013.01); *H04W 72/08* (2013.01); *H04L 69/323* (2013.01); *H04W 72/1278* (2013.01)
USPC .................................................... 370/230.1

(58) Field of Classification Search
CPC . H04W 36/02; H04W 72/1278; H04W 72/08; H04L 69/323
USPC ........................................................ 370/230.1
See application file for complete search history.

(56) References Cited

U.S. PATENT DOCUMENTS

| | | | | |
|---|---|---|---|---|
| 5,432,824 | A * | 7/1995 | Zheng et al. | 375/356 |
| 7,130,286 | B2 * | 10/2006 | Koodli et al. | 370/331 |
| 7,554,987 | B2 * | 6/2009 | Proctor et al. | 370/395.21 |
| 2002/0097677 | A1 * | 7/2002 | Hoar et al. | 370/230 |
| 2002/0172217 | A1 * | 11/2002 | Kadaba et al. | 370/443 |
| 2002/0191562 | A1 * | 12/2002 | Kumaki et al. | 370/331 |
| 2003/0016698 | A1 | 1/2003 | Chang et al. | |

(Continued)

FOREIGN PATENT DOCUMENTS

| | | |
|---|---|---|
| CA | 2405581 A1 | 4/2003 |
| CN | 1682501 A | 10/2005 |

(Continued)

OTHER PUBLICATIONS

Third Generation Partnership Project, "Technical Specification Group Radio Access Network; Evolved Universal Terrestrial Radio Access (E-UTRA) and Evolved Universal Terrestrial Radio Access Network (E-UTRAN); Stage 2 (Release 8)," 3GPP TS 36.300, V.8.0.0, (Mar. 2007).

(Continued)

*Primary Examiner* — Jason Mattis
*Assistant Examiner* — Stephen J Clawson
(74) *Attorney, Agent, or Firm* — Condo Roccia Koptiw LLP

(57) ABSTRACT

A method and an apparatus are provided for initializing token buckets to a non-zero value, preserving the token buckets during a medium access control (MAC) reset or handover, resetting the token buckets based on a minimum bucket size or ratio of sizes, and transmitting a token status report.

13 Claims, 5 Drawing Sheets

(56) References Cited

U.S. PATENT DOCUMENTS

| | | | |
|---|---|---|---|
| 2003/0231648 A1 | 12/2003 | Tang | |
| 2004/0052229 A1 | 3/2004 | Terry et al. | |
| 2004/0066764 A1 | 4/2004 | Koodli et al. | |
| 2004/0208183 A1 | 10/2004 | Balachandran et al. | |
| 2005/0047335 A1* | 3/2005 | Cheng et al. | 370/229 |
| 2005/0047416 A1* | 3/2005 | Heo et al. | 370/395.4 |
| 2006/0029096 A1 | 2/2006 | Babbar et al. | |
| 2006/0194579 A1 | 8/2006 | Leung et al. | |
| 2007/0133407 A1* | 6/2007 | Choi et al. | 370/230 |
| 2007/0133471 A1* | 6/2007 | Kim et al. | 370/331 |
| 2009/0086676 A1* | 4/2009 | Meylan et al. | 370/331 |
| 2009/0257398 A1* | 10/2009 | Koyanagi et al. | 370/331 |

FOREIGN PATENT DOCUMENTS

| | | |
|---|---|---|
| CN | 1787483 A | 6/2006 |
| JP | 2004-320775 A | 11/2004 |
| JP | 2005-539468 A | 12/2005 |
| KR | 2006-0094911 A | 8/2006 |
| RU | 2242092 C2 | 12/2004 |
| WO | 03/017711 | 2/2003 |
| WO | 2004/025842 | 3/2004 |
| WO | WO 2006/096789 A1 | 9/2006 |

OTHER PUBLICATIONS

Third Generation Partnership Project, "Technical Specification Group Radio Access Network; Evolved Universal Terrestrial Radio Access (E-UTRA) and Evolved Universal Terrestrial Radio Access Network (E-UTRAN); Stage 2 (Release 8)," 3GPP TS 36.300, V.8.3.0, (Dec. 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Stage 2 (Release 8)," 3GPP TS 36.300, V.8.7.0, (Dec. 2008).
Third Generation Partnership Project, "Technical Specification Group Radio Access Network; Evolved Universal Terrestrial Radio Access (E-UTRA) Radio Link Control (RLC) protocol specification (Release 8)," 3GPP TS 36.322, V.1.2.0, (Nov. 2007).
Third Generation Partnership Project, "Technical Specification Group Radio Access Network; Evolved Universal Terrestrial Radio Access (E-UTRA) Radio Link Control (RLC) protocol specification (Release 8)," 3GPP TS 36.322, V.8.0.0, (Dec. 2007).
Third Generation Partnership Project, "Technical Specification Group Radio Access Network; Evolved Universal Terrestrial Radio Access (E-UTRA) Radio Link Control (RLC) protocol specification (Release 8)," 3GPP TS 36.322, V.8.4.0, (Dec. 2008).
Third Generation Partnership Project, "Technical Specification Group Radio Access Network; Radio Link Control (RLC) protocol specification (Release 6)," 3GPP TS 25.322, V.6.10.0, (Jun. 2007).
Third Generation Partnership Project, "Technical Specification Group Radio Access Network; Radio Link Control (RLC) protocol specification (Release 6)," 3GPP TS 25.322, V.6.12.0, (May 2008).
Third Generation Partnership Project, "Technical Specification Group Radio Access Network; Radio Link Control (RLC) protocol specification (Release 7)," 3GPP TS 25.322, V.7.5.0, (Dec. 2007).
Third Generation Partnership Project, "Technical Specification Group Radio Access Network; Radio Link Control (RLC) protocol specification (Release 7)," 3GPP TS 25.322, V.7.8.0, (Sep. 2008).
Third Generation Partnership Project, "Technical Specification Group Radio Access Network; Radio Link Control (RLC) protocol specification (Release 8)," 3GPP TS 25.322, V.8.0.0, (Dec. 2007).
Third Generation Partnership Project, "Technical Specification Group Radio Access Network; Radio Link Control (RLC) protocol specification (Release 8)," 3GPP TS 25.322, V.8.3.0, (Sep. 2008).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321, V.8.0.0, (Dec. 2007).
Third Generation Partnership Project, "Technical Specification Group Radio Access Network; Evolved Universal Terrestrial Radio Acess (E-UTRA) Medium Access Control (MAC) protocol specification (Release 8)," 3GPP TS 36.321, V.8.4.0, (Dec. 2008).
Third Generation Partnership Project, "Technical Specification Group Radio Access Network; Evolved Universal Terrestrial Radio Access (E-UTRA) Radio Resource Control (RRC); Protocol Specification (Release 8)" 3GPP TS 36.331, V.0.5.0, (Nov. 2007).
Third Generation Partnership Project, "Technical Specification Group Radio Access Network; Evolved Universal Terrestrial Radio Access (E-UTRA) Radio Resource Control (RRC); Protocol Specification (Release 8)," 3GPP TS 36.331, V.8.0.0, (Dec. 2007).
Third Generation Partnership Project, "Technical Specification Group Radio Access Network; Evolved Universal Terrestrial Radio Access (E-UTRA) Radio Resource Control (RRC); Protocol Specification (Release 8)," 3GPP TS 36.331, V.8.4.0, (Dec. 2008).
Third Generation Partnership Project, "Technical Specification Group Radio Access Network; Radio Interface Protocol Architechture (Release 6)," 3GPP TS 25.301, V.6.5.0, (Sep. 2007).
Third Generation Partnership Project, "Technical Specification Group Radio Access Network; Radio Interface Protocol Architecture (Release 6)," 3GPP TS 25.301, V.6.6.0, (Mar. 2008).
Third Generation Partnership Project, "Technical Specification Group Radio Access Network; Radio Interface Protocol Architecture (Release 7)," 3GPP TS 25.301, V.7.3.0, (Sep. 2007).
Third Generation Partnership Project, "Technical Specification Group Radio Access Network; Radio Interface Protocol Architecture (Release 7)," 3GPP TS 25.301, V.7.4.0, (Mar. 2008).
Third Generation Partnership Project, "Technical Specification Group Radio Access Network; Radio Interface Protocol Architecture (Release 8)," 3GPP TS 25.301, V.8.0.0, (Dec. 2007).
Third Generation Partnership Project, "Technical Specification Group Radio Access Network; Radio Interface Protocol Architecture (Release 8)," 3GPP TS 25.301, V.8.4.0, (Dec. 2008).
Ericsson, "UL LCH prioritization," 3GPP TSG-RAN WG2 Meeting =60bis, R2-080089, (Sevilla, Spain, Jan. 14-18, 2008).
NSN, Nokia, "UL resource utilisation," 3GPP TSG-RAN WG2 Meeting =60bis, R2-080220, (Sevilla, Spain, Jan. 14-18, 2008).
LG Electronics, Inc., "Prioritization for equal priority RB," 3GPP TSG-RAN WG2 Meeting =60bis, R2-080157, (Sevilla, Spain, Jan. 14-18, 2008).
Qualcomm, "Text Proposal for UL Logical Channel Prioritisation," 3GPP TSG-RAN WG2 Meeting =60bis, R2-080376, (Sevilla, Spain, Jan. 14-18, 2008).
Qualcomm, "Text Proposal for UL Logical Channel Prioritisation with Segmentation Optimisation," 3GPP TSG-RAN WG2 Meeting =60bis, R2-080377, (Sevilla, Spain, Jan. 14-18, 2008).
Barry et al., "Distributed Control Algorithms for Service Differentiation in Wireless Packet Networks," INFOCOM 2001. IEEE Twentieth Annual Joint Conference of the IEEE Computer and Communications Societies, vol. 1, pp. 582-590 (Apr. 2001).
Chen et al., "An Adaptive Buffer Allocation Mechanism for Token Bucket Flow Control," IEEE 60th Vehicular Technology Conference, vol. 4, pp. 3020-3024 (Sep. 2004).
Ericsson, "UL LCH prioritization," 3GPP TSG-RAN WG2 Meetings =60bis, R2-080089, (Sevilla, Spain, Jan. 14-18, 2008).
Lee, "Correlated Token Bucket Shapers for Multiple Traffic Classes," IEEE 60th Vehicular Technology Conference, vol. 7, pp. 4672-4676 (Sep. 2004).
LG Electronics, Inc., "Prioritization for equal priority RB,"3GPP TSG-RAN WG2 Meeting =60bis, R2-080157, (Sevilla, Spain, Jan. 14-18, 2008).
Luo et al., "An Adaptive Measure-Based Preassignment Scheme with Connection-Level QoS Support for Support for Mobile Networks," IEEE Transactions on Wireless Communications, vol. 1, No. 3 (Jul. 2002).
NSN, Nokia, "UL resource utilisation," 3GPP TSG-RAN WG2 Meeting =60 bis, R2-080220, (Sevilla, Spain, Jan. 14-18, 2008).
Third Generation Partnership Project, "Technical Specification Group Radio Access Network; Evolved Universal Terrestrial Radio Access (E-UTRA) Radio Link Control (RLC) protocol specification (Release 8),"3GPP TS 36.322, V.1.2.0, (Nov. 2007).

(56) References Cited

OTHER PUBLICATIONS

Third Generation Partnership Project, "Technical Specification Group Radio Access Network; Evolved Universal Terrestrial Radio Access (E-UTRA) Radio Link Control (RLC) protocol specification (Release 8)," 3GPP TS 35.322, V.8.4.0, (Dec. 2008).

Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321, V.8.4.0, (Dec. 2008).

Third Generation Partnership Project, "Technical Specification Group Radio Access Network; Evolved Universal Terrestrial Radio Access (E-UTRA) Radio Resource Control (RRC); Protocol Specification (Release 8)," 3GPP TS 36.331, V.0.5.0, (Nov. 2007).

Third Generation Partnership Project, "Technical Specification Group Radio Access Network; Radio Interface Protocol Architecture (Release 6)," 3GPP TS 25.301, V.6.5.0, (Sep. 2007).

3$^{rd}$ Generation Partnership Project (3GPP), R2-074860, "Scheduling Information for Uplink Scheduling", Panasonic, 3 GPP TSG RAN WG2 Meeting =60, Jeju, Korea, Nov. 5-9, 2007, 4 pages.

\* cited by examiner

METHOD AND APPARATUS FOR INITIALIZING, PRESERVING, AND RECONFIGURING TOKEN BUCKETS

CROSS REFERENCE TO RELATED APPLICATIONS

This application claims the benefit of U.S. Provisional Application Ser. No. 61/025,478, filed on Feb. 1, 2008, which is incorporated by reference as if fully set forth.

FIELD OF INVENTION

This application is related to wireless communications.

BACKGROUND

FIG. 1 shows a conventional user plane protocol stack 100 for the Long Term Evolution (LTE) architecture. The stack 100 includes a Packet Data Convergence Protocol (PDCP) layer, Radio Link Control (RLC) layer, Medium Access Control (MAC) layer, and physical (PHY) layer in a wireless transmit receive unit (WTRU) and corresponding layers in an evolved Node-B (eNB). The eNB is connected to a System Architecture Evolution (SAE) gateway by means of an S1-U interface.

According to the Third Generation Partnership Project (3GPP) standard, the LTE MAC sublayer supports mapping between logical channels and transport channels. The MAC sublayer supports multiplexing of MAC service data units (SDUs) from one or more logical channels onto transport blocks (TBs) for delivery to the PHY layer via transport channels. The MAC sublayer also supports demultiplexing of the MAC from one or more logical channels from the TBs delivered from the PHY layer via transport channels. In addition, the MAC sublayer supports logical channel prioritization and transport format selection.

A function of the MAC sublayer is the prioritization of the logical channels. The MAC entity may receive the MAC SDUs from different logical channels that are from the RLC layer. The MAC entity then multiplexes the SDUs onto one transport channel.

FIG. 2 shows the MAC multiplexing data from multiple logical channels onto one transport channel. The multiple logical channels may include dedicated traffic channels (DTCHs), dedicated control channels (DCCHs), or common control channels (CCCHs). In the example of FIG. 2, the one transport channel is shown as an uplink shared channel (UL-SCH).

The logical channel prioritization is applied when a new MAC transmission is performed. A radio resource control (RRC) sublayer in the WTRU controls scheduling of uplink data by assigning each logical channel a priority value. An increasing priority value indicates a lower priority level for the logical channel. Additionally, each logical channel is assigned a prioritized bit rate (PBR) and a maximum bit rate (MBR). A WTRU serves all logical channels in a decreasing priority order up to their configured PBR. If any resources remain, all logical channels are served in a decreasing priority order up to their configured MBR. If a MBR is not configured, then the logical channels are served until the data for the logical channel is exhausted or an uplink grant is exhausted, whichever comes first. The WTRU serves all logical channels configured with the same priority equally. The MAC control elements for buffer status report (BSR), with the exception of padding BSR, have higher priority than user plane logical channels.

In the 3GPP standards, a WTRU has an uplink rate control function that manages sharing of uplink resources between radio bearers. The RRC controls the uplink rate control function by giving each bearer a priority and a PBR. The RRC also provides an MBR per guaranteed bit rate (GBR) bearer. The values signaled by the WTRU may not be related to the values signaled via interface S1 to the eNB. If more than one radio bearer has the same priority, then the WTRU serves these radio bearers equally.

There are several proposals discussing the details of logical channel prioritization and MAC multiplexing. The proposals agree on specifying the input parameters and the constraints for the output of the WTRU.

The proposals assume a token bucket model for the specification of input parameters. The PBR or the MBR is derived from the WTRU using the token rate, from a fixed size, or is signaled from the eNB. The PBR or the GBR does not limit the reported buffer status. The proposals utilize a token bucket model to describe the rate calculations, whereby each logical channel may have token buckets, related to the PBR and the MBR. The rates at which tokens are added to the buckets are the PBR and the MBR. A size of the token bucket may not exceed a predetermined maximum value.

One proposal describes a process for rate calculations or token bucket calculations. For each time increment of a bearer, $T_j$, that has a PBR, the PBR credit associated with the bearer j is incremented by a value of $T_j \times PBR_j$. If the bearer also has an MBR, then the MBR credit associated with the bearer j is incremented by a value of $T_j \times MBR_j$. If upper limits are set for the maximum PBR and if the accumulated values exceed the maximum values, then they are set to the maximum value. If the MBR credits are set for the bearer j, and if the accumulated values exceed the maximum values, then they are set to the maximum value. At each scheduling opportunity transmission time interval (TTI), where the WTRU is permitted to transmit a new data, the scheduler selects data from the highest priority bearer that has a non-empty buffer state and non-zero PBR credit. The scheduler may add to the TB data equal to the size of the buffer, the size of the PBR credit, or the available capacity of the TB, whichever is the smaller. The PBR credit and the MBR credit are decremented by the quantity of data assigned.

If the PBR credit of all bearers is zero and a space is available in the TB, then the scheduler accepts data from the highest priority bearer with a buffered data, up to the size of the available space in the TB or the MBR credit of the WTRU, whichever is the smaller. The MBR credit is decremented by the quantity of data that was accepted.

FIG. 3 shows a conventional MAC protocol data unit (PDU), which includes a MAC header, MAC control elements, MAC SDUs, and padding bits. Both the MAC header and the MAC SDUs may be of variable size. The MAC PDU header includes at least one MAC PDU sub-header, where each sub-header corresponds to either a MAC SDU, a MAC control element, or padding bits. The MAC layer may generate MAC control elements, such as the BSR control elements. The MAC control elements may be identified via specific values for the Logical Channel ID (LCID), as illustrated in Table 1 below.

TABLE 1

| Index | LCID values |
| --- | --- |
| 00000-yyyyy | Identity of the logical channel |
| yyyyy-11100 | reserved |

TABLE 1-continued

| Index | LCID values |
|---|---|
| 11101 | Short Buffer Status Report |
| 11110 | Long Buffer Status Report |
| 11111 | Padding |

The indexes 00000-yyyyy, shown in Table 1 above, may correspond to actual logical channels that have corresponding RLC entities. The remaining indexes may be used for identifying the MAC control elements, such as BSRs or padding.

According to the 3GPP standards, some services and functions of the LTE RLC sublayer include transfer of upper layer PDUs supporting acknowledged mode (AM) or unacknowledged mode (UM). The RLC sublayer also include transparent mode (TM) data transfer, error correction through automatic repeat request (ARQ), in-sequence delivery of upper layer PDUs (except at handover in the uplink), flow control between the eNB and WTRU, SDU discard, and RLC reset. Accordingly, the RLC supports three modes of operation: the AM, the UM, and the TM.

To ensure service continuity and to minimize service interruption, it would be beneficial to provide a method an apparatus to initialize token buckets, to preserve token buckets upon certain events, to reconfigure token buckets, and to communicate the status of token buckets using enhanced BSRs or new control elements.

SUMMARY

A method and an apparatus are provided to initialize token bucket to a non-zero value, to receive a scheduling grant, and to transmit data in response to receiving the grant.

A method and an apparatus are provided with initiate a medium access control (MAC) reset, determine whether to preserve a value of a token bucket or whether to re-initialize the value of the token bucket during the MAC reset, preserve the value of the token bucket in response to a determination to preserve the value of the token bucket, and re-initializing the value of the token bucket in response to a determination to re-initialize the value of the token bucket.

A method and an apparatus are provided to receive a request to generate a token status report, wherein the request is received as part of a medium access control (MAC) element, to generate the token status report in response to the request, and to transmit a total amount of tokens as part of a buffer status report.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Hereinafter, the RLC PDUs or RLC PDU segments may be considered as equivalent to MAC SDUs. Further, when referring to updating the token/credit bucket, it may be considered as refer to subtracting an amount of tokens/credits from the bucket with the amount corresponding to the MAC SDU size(s), or adding tokens/credits at the bucket update interval. Also, token bucket, or credit calculations, may be considered as equivalent to data rate calculations or rate control calculations. Furthermore, the token/credit bucket will be referred to hereafter as a token bucket.

Figure 1:
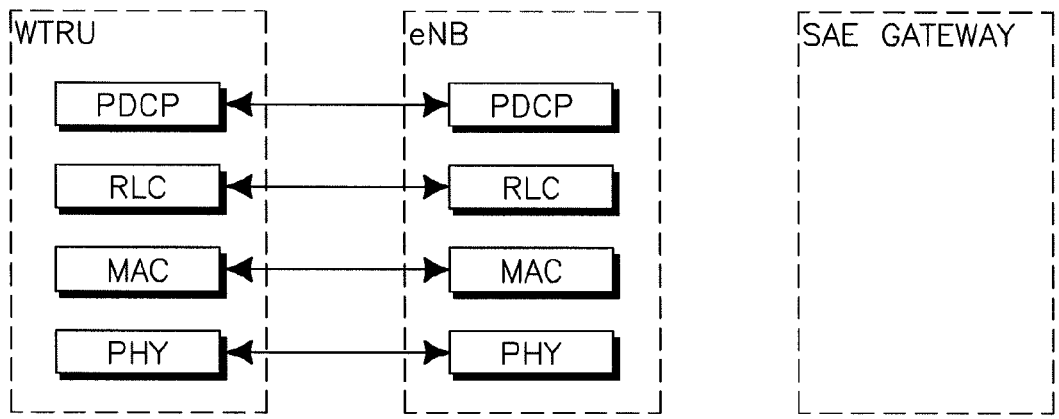
FIG. 1 shows a conventional LTE user plane protocol stack.
Figure 2:
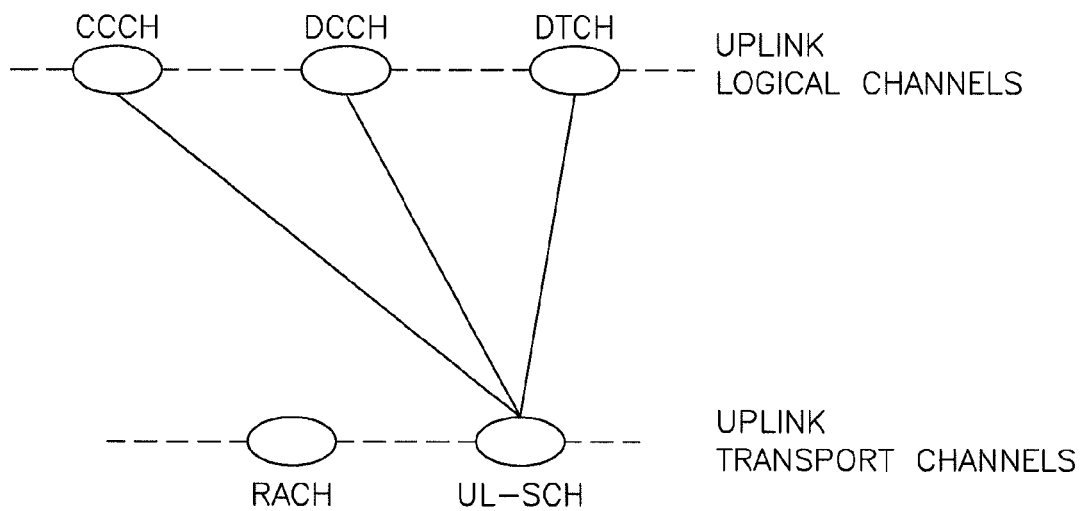
FIG. 2 is an illustration of conventional MAC mapping and multiplexing for uplink communication.
Figure 3:
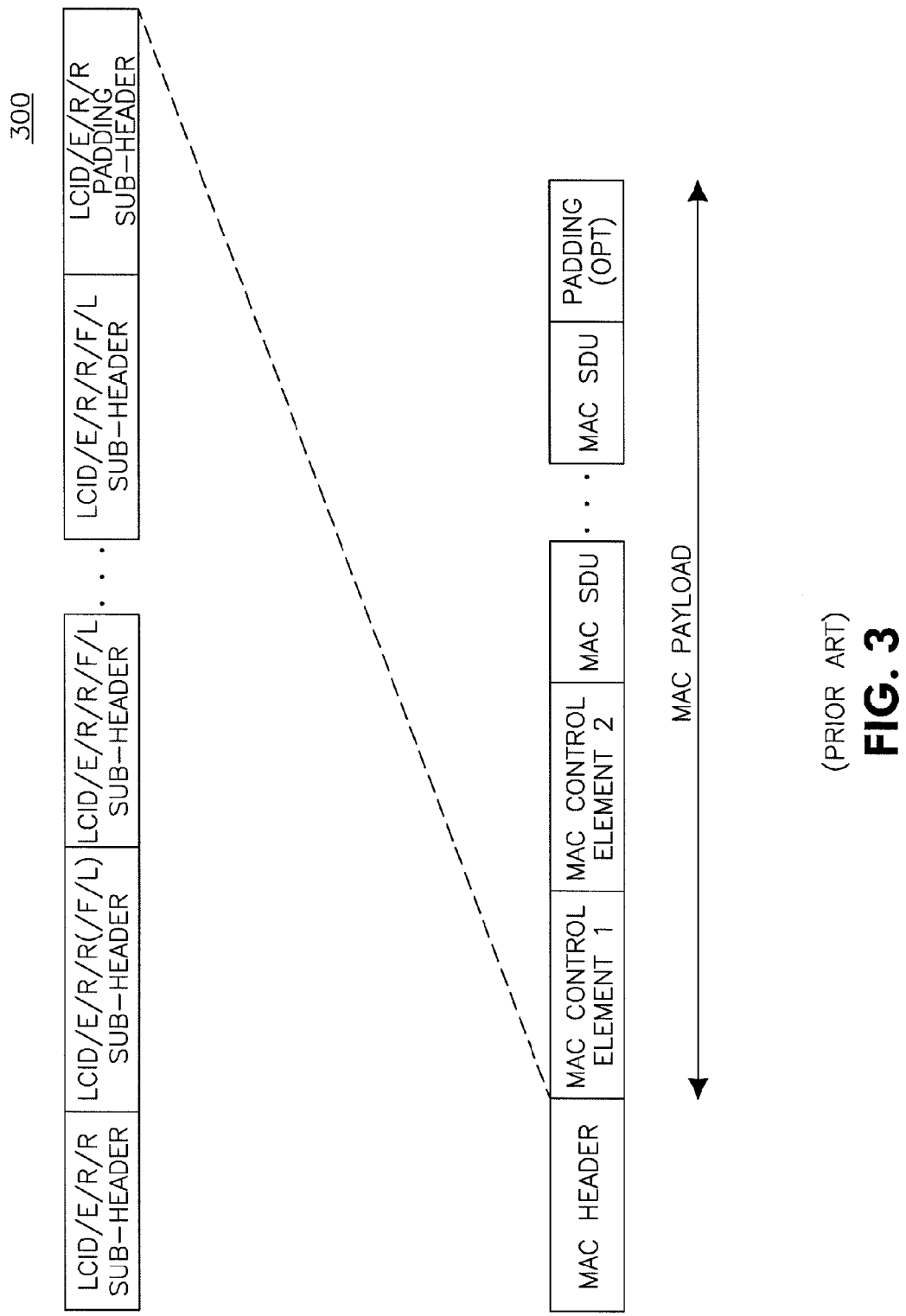
FIG. 3 shows a conventional structure of a MAC PDU according to a 3GPP standard specification.
Figure 4:
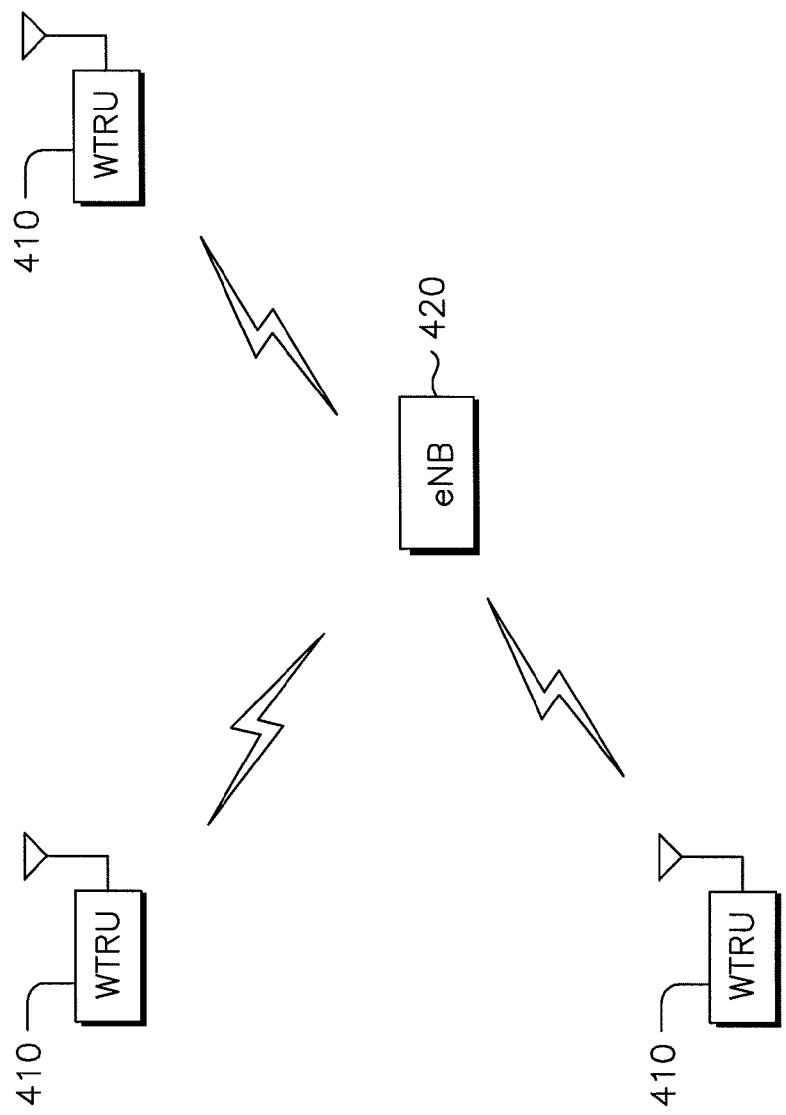
FIG. 4 shows an example wireless communication system including a plurality of WTRUs and an eNB.

FIG. 4 shows an example wireless communication system 400 including a plurality of WTRUs 410 and an eNB 420. As shown in FIG. 4, the WTRUs 410 are in communication with the eNB 420. Although three WTRUs 410 and one eNB 420 are shown in FIG. 1, it should be noted that any combination of wireless and wired devices may be included in the wireless communication system 400.

Figure 5:
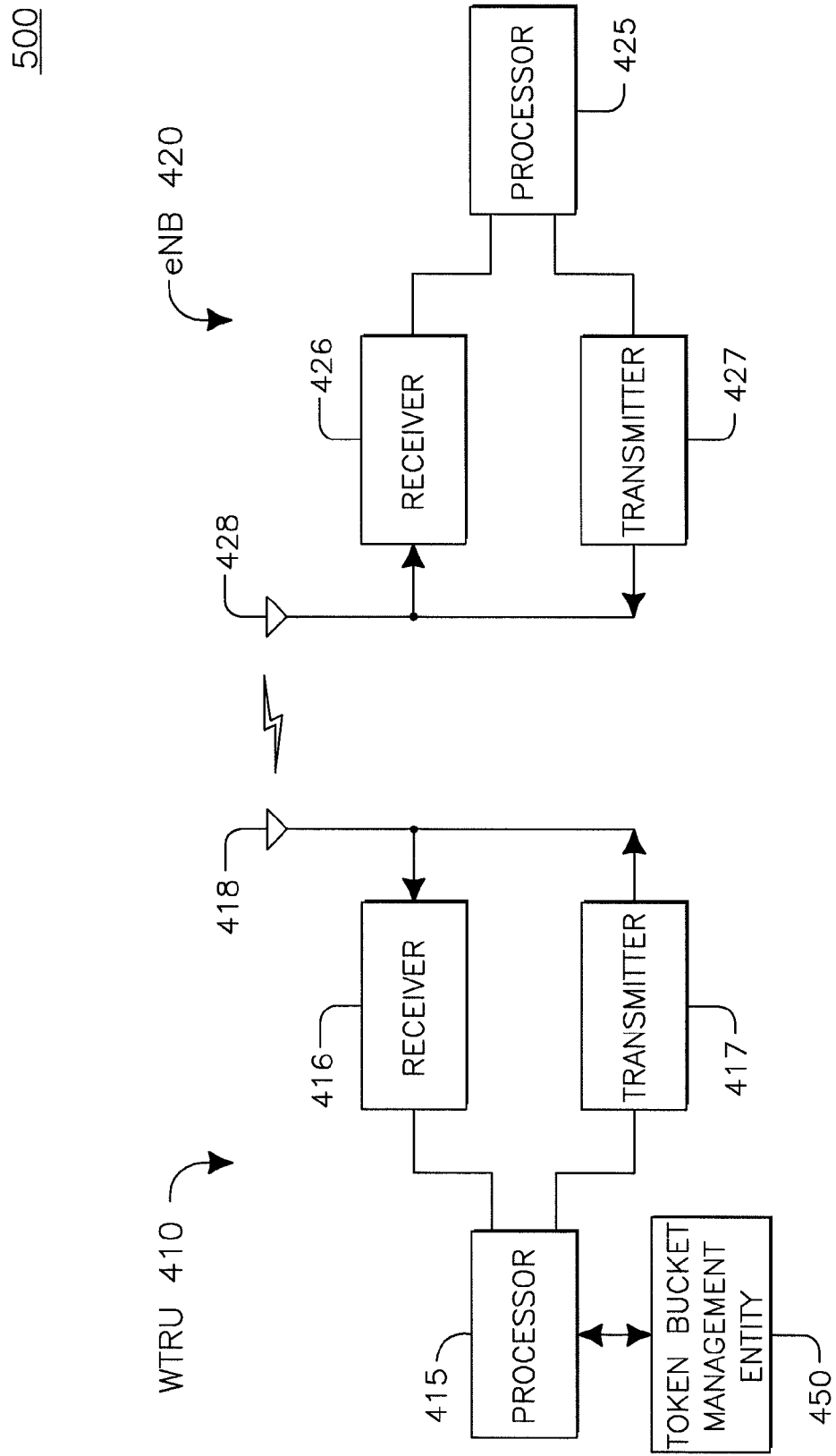
FIG. 5 is an example functional block diagram of a WTRU and the eNB of the wireless communication system shown in FIG. 4.

FIG. 5 is a functional block diagram 500 of a WTRU 410 and the eNB 420 of the wireless communication system 400 of FIG. 4. As shown in FIG. 5, the WTRU 410 is in communication with the eNB 420 and both may be configured to initialize, preserve, and reconfigure the token buckets.

In addition to the components that may be found in a typical WTRU, the WTRU 410 includes a processor 415, a receiver 416, a transmitter 417, and an antenna 418. The processor 415 is configured to perform a method for initializing, preserving, and reconfiguring the token buckets. The receiver 416 and the transmitter 417 are in communication with the processor 415. The antenna 418 is in communication with both the receiver 416 and the transmitter 417 to facilitate the transmission and reception of wireless data. The WTRU 410 also includes a token bucket management entity 450, which will be described in more detail below.

In addition to the components that may be found in a typical eNB, the eNB 420 includes a processor 425, a receiver 426, a transmitter 427, and an antenna 2428. The processor 425 is configured to perform a method for initializing, preserving, and reconfiguring the token buckets. The receiver 426 and the transmitter 427 are in communication with the processor 425. The antenna 428 is in communication with both the receiver 426 and the transmitter 427 to facilitate the transmission and reception of wireless data.

Continuing to refer to FIG. 5, the token bucket management entity 450 processes token buckets. That is the token bucket management entity 450 determines if there is a initialization, handover, reconfiguration, or reset event. If there is reset event, then the token bucket management entity 450 performs a bucket reset function. If there is bucket reconfiguration, then the token bucket management entity 450 performs a bucket reconfiguration function.

The WTRU 410 may be configured to initialize the PBR buckets to the amount of tokens corresponding to one token update time interval. Additionally, the WTRU 410 may also be configured to initialize the MBR buckets to the amount of tokens corresponding to one token update time interval. For example, the PBR may be initialized to a value of Tj×PBRj, while the MBR may be initialized to a value of Tj×MBRj.

Initializing token buckets based on a non-zero value allows the WTRU 410 to minimize segmentation and to begin transmitting information when it receives the scheduling grant rather than incurring a delay due to the need to accumulate more tokens.

Alternatively, the maximum value of the bucket may be the PBR or MBR at the update rate multiplied by a number of updates. The bucket update rate multiplied by the number of updates may be considered the bucket duration. The WTRU 410 may be configured to initialize the PBR and the MBR buckets to the amount of tokens corresponding to N token update time intervals. For example, the PBR may be initialized to the value of N×Tj×PBRj and the MBR may be initialized to the value of N×Tj×MBRj, where Tj is a token updating time increment for j bearer and N is an integer that may be configurable. The value of N may be configured using the RRC. Alternatively, Nj may be used instead of N.

The WTRU 410 may also be configured to initialize the PBR and the MBR buckets to their maximum values. The bucket may be initialized to a maximum number of tokens the bucket is allowed to accumulate. Once the bucket reaches this level it is not increased in size at subsequent bucket update intervals. The bucket update rate multiplied by the maximum number of updates, N, may be considered the maximum bucket duration.

The WTRU 410 may be configured to initialize the PBR and the MBR buckets to zero. Alternatively, the WTRU 410 may be configured to initialize the PBR and the MBR buckets to predetermined values indicated using RRC information elements (IEs) carried in a RRC message. These IE's may include an initial value or may include the PBR and/or MBR token update size, the update periodicity, and the maximum bucket size or bucket duration.

The token buckets may be preserved at handover or at a MAC reset, and the WTRU 410 may maintain the token bucket values during handover or a MAC reset. The last value of the PBR and/or MBR bucket determined in the previous cell is applied as the initial value in the new cell. Service continuity and minimization of interruption time may be achieved from this. The WTRU 410 may be configured to not re-initialize the token bucket values during handover or during a MAC reset or the WTRU 410 may be configured to maintain the token bucket values during all handover events.

The WTRU 410 may be configured to use a predetermined RRC indication to indicate whether the WTRU 410 may maintain a token bucket value or re-initialize the token bucket value during a MAC reset. The predetermined RRC indication may either be a RRC primitive or a RRC IE. In addition, the maintenance of the token buckets may be applied selectively to logical channels. For example, a logical channel's token bucket value may be maintained while the token bucket value of another logical channel is re-initialized.

Alternatively, if the token buckets are re-initialized during the handover or the MAC reset, the WTRU 410 may be reconfigured to re-initialize the token buckets to a non-zero value during the handover or the MAC reset. For example the bucket may be initialized to PBR*Tj or N*PBR*Tj.

The WTRU 410 may move from one cell or eNB 420 to another during intra-LTE handover. During the handover operation, the MAC entity may be reset or reconfigured. The MAC entity may also be reset or reconfigured when there is a radio link failure, which may occur due to an RLC reset or an upper layer reset. In each of these cases the token bucket may be reset or preserved as described above.

The PBR or the MBR of the WTRU 410 may be reconfigured by the eNB 420 at any time or during a handover. Additionally, the reconfiguration of the PBR and/or the MBR of the WTRU 410 may be performed as part of a MAC reconfiguration procedure.

As a result, the WTRU 410 may need to re-initialize its token buckets in accordance with a new configured bit rate. The token bucket management entity 450 may be located at RRC layer or may be located at MAC layer (not shown). The computation of the token bucket sizes may be performed by the MAC or by the RRC. If the token bucket sizes are performed by the RRC, the RRC may then reconfigure to the MAC. This may require signaling of primitives between the MAC and the RRC.

For example, the MAC provides the RRC with its current bucket values upon reconfiguration. Then, the RRC computes new bucket values using the signaled information and reconfiguration parameters. The RRC signals the new bucket values to the MAC.

Upon the PBR or the MBR reconfiguration, the WTRU 410 may be configured to re-initialize the token buckets. The WTRU 410 may be configured to compare the size of token buckets, and the WTRU 410 may be configured to re-adjust or scale the size of the token buckets.

Upon PBR or MBR reconfiguration, the WTRU 410 may reinitialize the token buckets by initializing the PBR and the MBR buckets to the maximum value of the PBR and the MBR bucket, respectively. The WTRU 410 may be configured to initialize the PBR and the MBR buckets to the amount of tokens corresponding to N token update time intervals.

For example, the PBR may be initialized to the value of N×Tj×PBRj and the MBR may be initialized to the value of N×Tj×MBRj, where Tj is the token updating time increment for j bearers and N is an integer that may be configurable. The value of N may be configured using the RRC. Alternatively, Nj may be used instead of N.

Alternatively, the WTRU 410 may initialize the PBR and MBR buckets to their maximum values, or initialize the PBR and MBR buckets to zero. Alternatively, the WTRU 410 may initialize the PBR and MBR buckets to predetermined values indicated using RRC IEs carried in a RRC message.

The WTRU 410 may initialize the PBR and the MBR token buckets to the amount of tokens corresponding to one token update time interval. For example, the PBR may be initialized to a value of Tj×PBRj, and the MBR may be initialized to a value of Tj×MBRj, where Tj is a token updating time increment.

Upon the PBR or the MBR reconfiguration, the RRC entity of the WTRU 410 or the MAC entity of the WTRU 410 may be configured to compare the current size of a token bucket with a newly specified maximum bucket size. If the current token bucket size is smaller than the new maximum bucket size, then the WTRU 410 may be configured to maintain the current bucket size. If the current token bucket size is larger than the new maximum bucket size, then the WTRU 410 may be configured to set the bucket size to the new maximum bucket size. The setting of the bucket size to the minimum of the current bucket size and the new maximum bucket size may also be referred to as token bucket clamping.

Upon the PBR or the MBR reconfiguration, the RRC entity of the WTRU 410 or the MAC entity of the WTRU 410 may be configured to readjust or scale the token bucket size in proportion to the ratio of the maximum bucket size. For example, the number of new tokens is a function of the number of old tokens times the ratio of the new maximum bucket size to the old maximum bucket size. Then, the token bucket is scaled relative to the old to new maximum bucket size ratio.

Alternatively, the token bucket size may be scaled in proportion to the ratio of bit rates. For example, the number of new tokens is a function of the number of old tokens times the ratio of a new bit rate to the old bit rate. Then, the token bucket is scaled to the old to new bit rate ratio.

Figure 6:
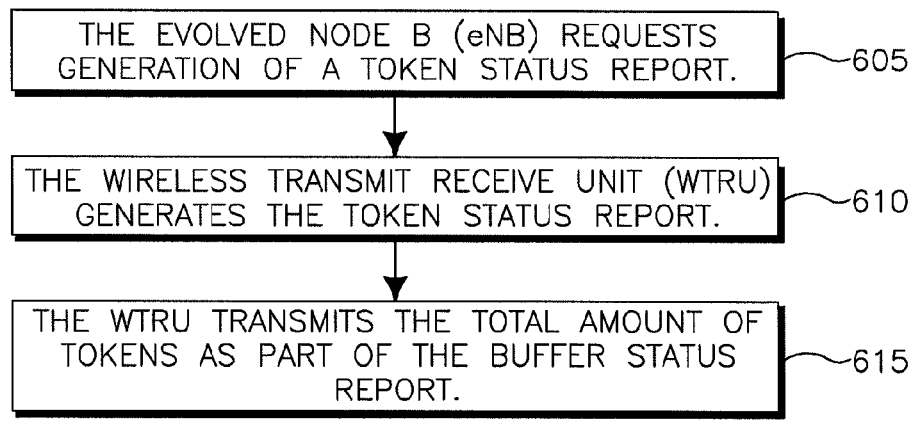
FIG. 6 is an example flow diagram of a method of processing a token status report.

FIG. 6 shows a diagram for the token status report. The eNB 420 transmits a request to the WTRU 410 requesting the WTRU 410 to generate the token status report (step 605). The request from the eNB 420 may be received as part of a new MAC control element or an RRC IE in an RRC message. The event that triggers the eNB 420 to transmit the request to the WTRU 410 is determined by the eNB implementation. For example, the triggering event may be as defined below.

The WTRU 410 may be configured to generate the token status report (step 610) requested by the eNB 420. The WTRU 410 may be configured to transmit total amount of tokens upon a triggering event. This information may be transferred as part of Buffer Status Report (BSR) (step 615). The WTRU 410 may be configured to transmit a token status report containing the current PBR or MBR token bucket values of the WTRU 410. The token status report may also contain any information related to or derived from the token buckets.

The token status reports may be included as an enhancement to the BSR. For example, the enhanced BSR may include information of the token buckets. The token status reports may be included in a new MAC control element. Alternatively, the token status reports may be included in an RRC IE contained in a RRC message. The WTRU 410 may generate the token status report based on an internal trigger.

The internal trigger and the triggering event may be any one of the following: handover, MAC reset, a reset at specific layer, MAC reconfiguration, a reconfiguration at a specific layer, and a request from the eNB 420. The triggering event or the internal trigger may be periodical, or at any another predefined time or event.

The WTRU 410 may be configured to generate a token status report in response to a request from the eNB 420. The eNB 420 is able to optimize scheduling operations using the capability of the token status report. The eNB 420 may be configured to synchronize its local computations with the computations of the WTRU 410 using the token status report capability. Furthermore, the eNB 420 may reconfigure bit rate parameters or token bucket values after receiving the token status report capability.

The token status report may include the absolute size of the PBR or the MBR buckets, the size of the PBR or the MBR buckets relative to their maximum bucket size, a bit to indicate whether the PBR or MBR bucket is full or not, a bit to indicate whether PBR or MBR bucket is empty or not, an indication of whether the WTRU 410 is PBR or MBR limited, or any other information related to or derived from the PBR or the MBR tokens. The information may be aggregated across multiple logical channels or buckets, or may be aggregated on a per logical channel basis.

The BSR is enhanced to provide token status report information by extending the BSR. For example, the BSR may include an extension flag. Alternatively, the WTRU 410 may be configured to transmit the total amount of accumulated tokens, PBR or MBR tokens, to the eNB 420 as part of the BSR to assist the eNB 420 with scheduling. Alternatively, the WTRU 410 may be configured to compare accumulated tokens with a predefined threshold, which may be configured by an RRC IE. Then, the WTRU 410 may be configured to report a value of 1 if the amount of accumulated tokens meets the predefined threshold or a value of 0 if the amount of accumulated tokens fails to meet the predefined threshold.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit receive unit (WTRU) comprising:
a processor configured to:
initialize a token bucket to a non-zero value in response to a reset of a medium access control (MAC) layer, the MAC layer reset initiated by a handover command, the MAC layer reset altering a size of the token bucket, and the initialization minimizing segmentation of data transmitted by the WTRU following the MAC layer reset; and
generate a token status report.

2. The WTRU as in claim 1 wherein the non-zero value is based on a ratio of a new maximum bucket size to an old maximum bucket size.

3. The WTRU as in claim 1 wherein the processor is further configured to compare a current size of the token bucket with a newly determined maximum bucket size, in response to a reconfiguration.

4. The WTRU as in claim 3 wherein if the current size is smaller than the maximum bucket size, then the processor maintains the current size of the token bucket.

5. The WTRU as in claim 3 wherein if the current size is larger than the maximum bucket size, then the processor utilizes the token bucket size to the maximum size.

6. The WTRU as in claim 3 wherein the processor is further configured to readjust the token bucket size based on a ratio of the newly determined maximum bucket size and a previous maximum bucket size.

7. The WTRU as in claim 3, wherein the processor is further configured to readjust the token bucket size based on a ratio of a new bit rate and an old bit rate.

8. The WTRU as in claim 3 wherein the non-zero value is based on a maximum value of a prioritized bit rate (PBR).

9. The WTRU as in claim 8 wherein the PBR is initialized based on an amount of the tokens according to a token update time interval.

10. A wireless transmit receive unit (WTRU) comprising:
a receiver configured to receive a request to generate a token status report, wherein the request is received as part of a medium access control (MAC) element and in response to a MAC reset, the token status report including a prioritized bit rate (PBR) token bucket value and a current PBR token bucket size relative to a maximum PBR token bucket size;
a processor configured to generate the token status report in response to the request; and
a transmitter configured to transmit a total amount of tokens as part of a buffer status report.

11. The WTRU as in claim 10 wherein the receiver is further configured such that the request is also received in response to a MAC reconfiguration.

12. The WTRU as in claim 10 wherein the receiver is further configured such that the request is also received in response to reconfiguration of a layer.

13. A wireless transmit receive unit (WTRU) comprising:
a receiver configured to receive a request to generate a token status report, wherein the request is received as part of a medium access control (MAC) element and in response to a reset of a layer, the token status report including a prioritized bit rate (PBR) token bucket value and a current PBR token bucket size relative to a maximum PBR token bucket size;
a processor configured to generate the token status report in response to the request; and
a transmitter configured to transmit a total amount of tokens as part of a buffer status report.

* * * * *